United States Patent Office 3,250,058
Patented May 10, 1966

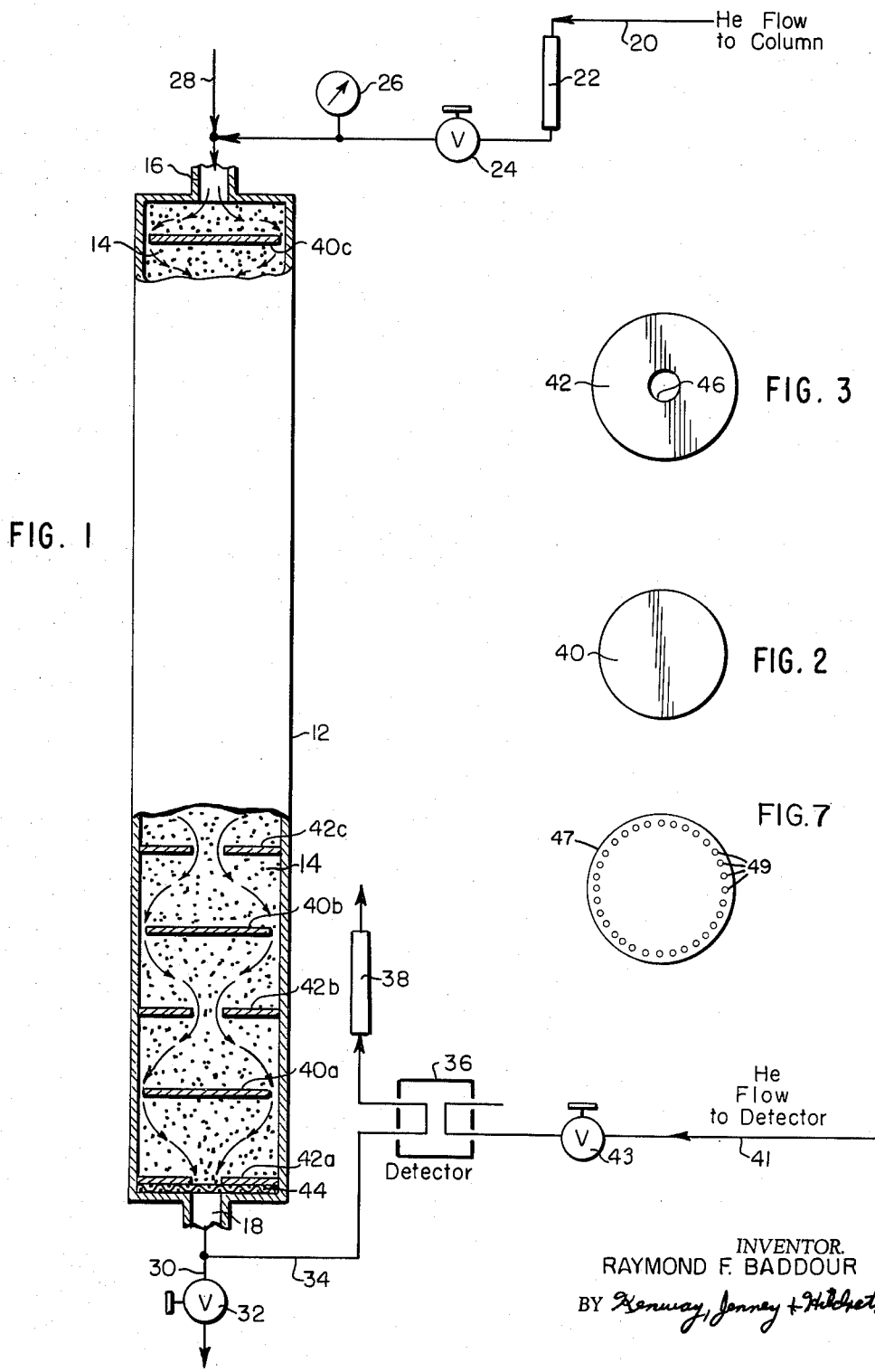

3,250,058
METHOD OF AND APPARATUS FOR CHROMATOGRAPHIC SEPARATIONS
Raymond Frederick Baddour, Belmont, Mass., assignor to Abcor, Inc., Cambridge, Mass., a corporation of Delaware
Continuation of application Ser. No. 246,782, Dec. 24, 1962. This application Sept. 23, 1965, Ser. No. 489,694
30 Claims. (Cl. 55—67)

This application is a continuation of my patent application S.N. 246,782 filed December 24, 1962, now abandoned.

My invention relates to an improved method of and an apparatus for the chromatographic separation of fluid streams, and in particular, to a method of and an apparatus for promoting the separation of materials in a relatively large diameter chromatographic column.

One of the difficulties which has heretofore tended to suppress the employment of chromatographic columns for the separation of materials on a commercial scale has been the tendency of columns to lose their resolving power and separatory ability as the diameter of the column increases. The scaling up of relatively small diameter laboratory chromatographic columns to relatively large diameter chromatographic columns of 2 inches or more has failed to give comparative separations. In fact, with large diameter columns, there is a rapid diminution in separation ability as the column increases in diameter. It is believed that the channeling of the fluid stream, especially near the walls in the packed bed of the chromatographic column, contributes to the poor resolving power and separatory ability of large diameter columns.

It is therefore an object of my invention to provide an apparatus for and a method of improving the separatory ability of relatively large diameter chromatographic columns.

It is also an object of my invention to provide an apparatus for and a method of inhibiting the channeling of fluid streams within a packed bed column.

Further objects and advantages of my invention will be apparent to those skilled in the art from the foregoing description taken in conjunction with the accompanying drawing wherein:

FIG. 1 is a schematic and partially cross sectional representation of a chromatographic apparatus including my improved chromatographic column.

FIGS. 2 and 3 illustrate one embodiment of the baffles that can be employed with my improved columns.

FIG. 7 illustrates one embodiment of another baffle that can be employed with my improved columns.

I have discovered that the separation ability of relatively large diameter chromatographic columns is greatly enhanced by incorporating within the packed bed of the column a certain arrangement of transverse baffles to induce lateral flow of the fluid stream flowing through the column.

I have found that the presence of lateral baffles in packed beds greatly inhibits channeling of the fluid material to be separated.

I have discovered also that the incorporation of either baffle type alone fails to promote good separation, but the employment of these baffles in combination permits superior separations of the components of a fluid stream in a chromatographic column of relatively large diameter.

Figure 4:
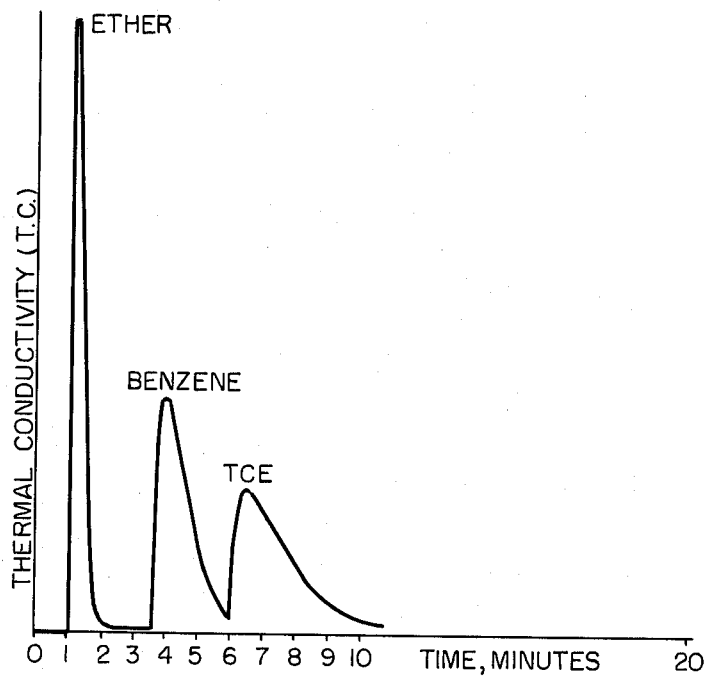
FIGS. 4, 5 and 6 are graphical representations of experimental data of thermal conductivity versus column retention time obtained with various components in chromatographic columns of relatively small diameter (FIG. 4) and in relatively large diameter columns with (FIG. 6) and without (FIG. 5) my inventive contribution.
Figure 5:
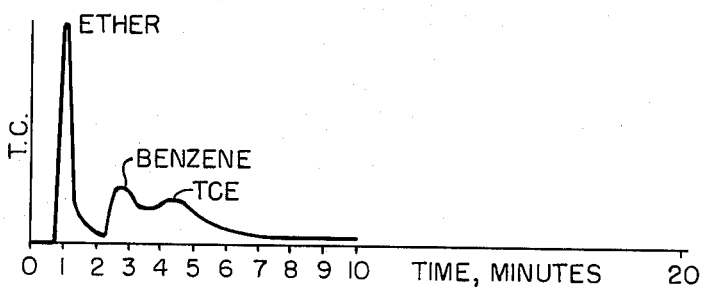
Figure 6:
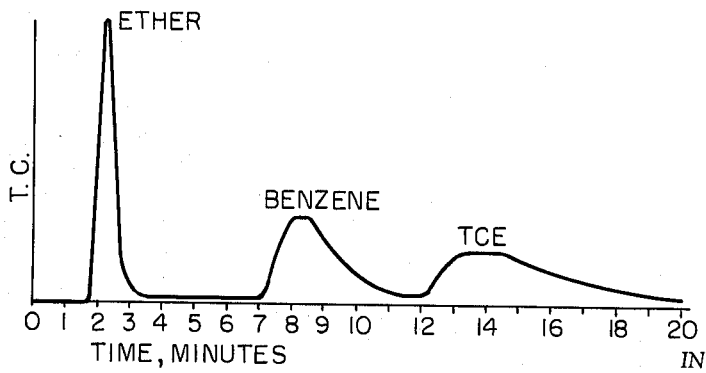

FIG. 1 shows a chromatographic apparatus 10 comprising an elongated cylindrical column 12 having an inlet 16, an outlet 18 and containing therein a bed of finely divided particles 14 capable of effecting the chromatographic separation of a fluid stream into two or more components. A carrier fluid, such as a gas like helium, is permitted to flow from a source (not shown) through an inlet conduit 20 containing a flow metering device 22, such as a Roto-Meter, a fluid flow control valve 24, and a pressure measuring device such as a pressure gage 26, to the column inlet 16. A conduit 28 permits the introduction of the material to be separated by the differences in retention time within the column to the upper inlet 16. Outlet 18 is in fluid flow communication with an outlet conduit 30 containing a flow control valve 32 and a sampling conduit 34, to which sampling conduit a portion of the effluent material from the chromatographic column 12 is continuously withdrawn and passed through a detecting device, such as a thermal conductivity cell 36, and hence to a flow meter 38 such as a capillary flow meter. The thermal conductivity cell or other detecting means identifies the particular component being withdrawn from the column by detecting the thermal conductivity of the sample gas in comparison to a carrier gas such as helium from a source (not shown). The helium gas serves as a base reference for comparison purposes in the thermal conductivity cell. The carrier gas is passed to the detector 36 from a reference conduit 41 containing a flow control valve 43 and continually passes to the reference side of the detector cell 36. The detector 36 is normally in electrical communication with a graph type recorder wherein a plot of thermal conductivity which identifies the particular gas of the sample effluent stream is plotted against the retention time of the sample of that gas in the chromatographic column. In this manner, graphical representations of thermal conductivity versus retention time in the column are obtained as shown in FIGS. 4, 5 and 6.

In one embodiment of my invention, the packed bed of adsorbent or absorbent material which commonly comprises subdivided particles has disposed therein and substantially transverse to the flow of the fluid stream through the column and thus transverse to the longitudinal axis of the column, a series of alternating disc baffles 40a, 40b and 40c and doughnut baffles 42a, 42b and 42c. The lower doughnut baffle 42a is supported on a glass fiber filter 44 which permits the flow of the fluid stream or material through the outlet 18 and which retains the particles 14 within the column.

In the embodiment shown, the disc and doughnut baffles are disposed in combination in alternating sequence. I have found that optimum results are achieved by arranging these baffles in an alternating sequence in a vertically disposed spatial arrangement within the packed bed with at least one of each baffle in the fluid column within a length represented by the diameter of the column. The employment of a combination of both disc and doughnut baffles is required to achieve the improved separations of my invention with relatively large size chromatographic columns. The number and ratio of disc to doughnut baffles and the spacing between baffles can be varied depending on the column diameter and the degree of separation desired. These horizontal baffles are so arranged within the column, or a portion of the packed bed of the column, to increase the radial mixing of the fluid material, to lengthen the fluid flow path of the fluid material passing through the column, and to inhibit channeling of the fluid material within the column.

The flat doughnut baffle 42 is characterized by a circular aperture 46 located in the center of the baffle. This baffle has a diameter approximately equal to or slightly less than the inner diameter of the column within which it is employed. The area of the aperture 46 is preselected to permit the passage of the fluid material without excessive pressure drop in the column. The flat disc 40 is characterized by an outer annular diameter such that the annular area between the disc and the internal diameter of the chromatographic column 12 is approximately equal to the area of the aperture opening 46 of the doughnut baffle 42. This matching of fluid flow areas between the baffles, or on the baffle plane, provides for a constant fluid flow rate per unit area through the column. I have also found it advantageous to dispose the first baffle 40c near the inlet 16 and to make this baffle a flat disc to induce the rapid and initial dispersion of the fluid material as it enters the column. The employment of doughnut shaped baffles 42 alone would tend to induce the flow of materials toward the center of the column and induce center channeling. The employment of only disc baffles 40 would tend to induce the flow of fluid material toward the wall of the column, and thus induce wall channeling of the fluid stream. A combination of both disc 40 and doughnut baffles 42 provides for the alternating and sequential flow of fluid material toward the wall of the chromatographic column and then toward the center of the column thereby inhibiting channeling and effecting excellent resolution and separation in relatively large diameter chromatographic columns. The flow path of a fluid material to be separated through a properly baffled column is diagrammatically illustrated by the flow arrows in column 12 of FIG. 1.

The baffles of my invention can be combined within packed beds in any suitable sequence which aids in the resolution and separation of a fluid stream and modification of these baffles is within the scope of my invention. For example, the aperture opening 46 of the doughnut baffle can be of more or less area than described, and can be of any desired regular or irregular shape such as a square, rectangular, elliptical, and the like. The center of the aperture need not be exactly center of the longitudinal axis of the elongated column, but may be disposed in a regular or irregular sequence to one or the other side to induce a spiral or other desirable flow pattern of the fluid material as it progresses from the inlet end to the outlet end of the column. The area aperture openings of each doughnut baffle can be the same or different area, or the same or different shape. The employment of different baffles of varying shape and aperture openings can be advantageous in aiding the control of the flow rate of the fluid material as it progresses through the column to create desired flow patterns and flow rates. For example, the aperture opening may be elliptical or rectangular with the baffles disposed in a two-to-one to one-to-two ratio with the disc baffles. Additionally, the major axis of the rectangle or ellipse can be off-set at various angles such as 30 degrees in a horizontal plane, to induce a spiral flow pattern of the fluid material through the column.

Further, the disc baffles can be modified to be of larger or smaller diameter than that described or to be the same or different diameters within the column. Although both baffles are shown as relatively flat baffles, it is, of course, recognized that both the doughnut and the disc baffles can be convex or concave. The annular area of the aperture of the disc baffles, that is the fluid flow path area between the internal diameter of the chromatographic column 12 and the disc 40, can be provided in whole or in part by peripheral apertures in the disc baffles of any size or shape, rather than obtaining this area by reducing the diameter of the disc baffle alone. FIG. 7 illustrates a baffle 47 having an external diameter similar to the doughnut baffle 42, and which includes a plurality of flow passages 49 therein.

The disc baffles of my invention then include any baffle whereby the fluid flow in a packed chromatographic column is directed in a lateral, peripheral, or radial direction toward the internal walls of the chromatographic column by the disc baffle. The doughnut baffles of my invention include any baffle or means whereby the fluid flow of the fluid material in a packed bed column is directed toward the baffle aperture or toward the center of the chromatographic column. This arrangement in combination inhibits channeling of the fluid flow and promotes excellent chromatographic separation of fluid materials in relatively large diameter columns.

The baffles of my invention can also be employed in other packed beds, such as in packed, fixed, or fluid catalytic beds to provide narrower residence time distribution of the reactants and products with the catalyst and with a high percentage of the fluid remaining in the bed for an optimum time. Additionally, the baffles of my invention will improve performance of packed absorption towers of either liquid or vapor or of other packed reactor columns, towers and the like where channeling of fluids inhibits proper efficiency and performance.

The subdivided material employed in the packed chromatographic columns or packed beds can be of any regular or irregular size or shape and may compose spheroids, fibers and the like. Suitable subdivided solid materials would include, but are not limited to, finely divided solid catalytic particles, alumina, natural and synthetic molecular sieves, charcoal, asbestos fibers, glass fibers, polyolefine particles like polypropylene and polyethylene, elastomeric, plastic and resinous particles, ion exchange resins, metallic and metallic oxide particles, clays, ceramics, diatomaceous earths, porcelain, rocks, vitreous material and the like. In chromatographic columns the packing material is selected to provide for the preselected affinity in retention of one or more of the materials of the fluid stream to obtain separation of the materials by the differential rate of absorption or adsorption by these particles within the column. The baffle combination of my invention may also be profitably employed in gaseous or liquid medium, such as organic liquids, water, steam, oil and the like or in combinations thereof.

For the purposes of illustrating the advantages of my invention, the application of my baffle arrangement and method to improving the performance of a chromatographic column to effect the chromatographic separation of a vapor stream will be described in reference to FIGS. 4, 5 and 6. The fluid mixture to be separated comprised an equivolume mixture of ethylether, benzene, and trichloroethylene (TCE). The material used to pack the column bed was Tide, a common household detergent, commonly employed for chromatographic separations. The packing material was pretreated by heating to 200° C. for eight hours to remove all volatile substances adsorbed on the surface of the particles. The material was then sifted and all particles between 30 and 60 mesh were retained for packing purposes. Two four-foot columns were employed, one a relatively small diameter glass tube having an internal diameter of about 6 millimeters, and the other a relatively large diameter glass tube having an internal diameter of about 49 millimeters. The carrier gas used was helium with the gas flow rate to the relatively small diameter column being about 80 milliliters per minute, while that to the larger diameter column was about 64 times this flow rate or about 5 liters per minute, so that the flow rate per unit area of each column would be similar. The size of the sample employed with the small column was 10 microliters, while the sample injected into the larger diameter column was about 0.6 milliliter to provide for a similar sample size per unit column area. The sample mixture was injected through conduit 28 to inlet 16 with the helium carrier gas introduced through conduit 20 with its flow rate and pressure controlled by 22 and 26. In the smaller diameter column the entire sample from outlet 18 was sent to a thermal conductivity cell, such as a Kromotog gas chromatographic unit, which unit measured the thermal conductivity of the gas in the column and compared it to that of the carrier and recorded the results of each one. In the larger diameter columns a portion of the 80 milliliters was removed through conduit 34 as in FIG. 1 and into the thermal conductivity cell 36 with the remaining effluent being withdrawin through conduit 30. The columns were packed by pouring the preheated adsorbent material 14 into the appropriate tubes, the samples injected and the thermal conductivity versus the column retention time recorded as in FIGS. 4, 5 and 6.

FIG. 4 illustrates the graphical results obtained with the relatively small diameter column operated at room temperature under the described conditions. The hydrocarbon components were readily separated into essentially the pure components. Good resolution was obtained as illustrated by the sharp peaks of the column and good separation was obtained as illustrated by the ordinate remaining at zero for a short period between each successive peak. In this small diameter column the separation between the ethylether and benzene was good, while the separation between the benzene and TCE was fair.

FIG. 5 illustrates the graphical results obtained with the relatively large diameter column operated at room temperatures under the described conditions. Repetition of the experiment as carried out with a relatively small diameter column with an unbaffled large diameter column gave good resolution of the ethylether and fair separation between the ethylether and the benzene, but the separation between the benzene and the TCE was very poor and wholly unsatisfactory. Thus, the scaling up from the relatively small diameter 6 millimeter column to the relatively large diameter 49 millimeter column failed to give comparable results in both resolution and separation, but in fact, produced wholly unacceptable separations between benzene and TCE.

FIG. 6 illustrates the graphical results obtained when the relatively large diameter column was repacked and baffled in accordance with my invention and then operated in a similar manner as in the column of FIG. 5. The baffles made of Durel Aluminum consisted of flat doughnut baffles with the outer diameter just about equal to the inner diameter of the large size glass tube with the baffles characterized by a circular hole in the center of approximately three-eighths of an inch in diameter. The disc baffles were flat baffles having an outer diameter designed to allow the same annular area between the internal walls of the glass tube and the outer diameter of the disc as the area of the aperture opening in the doughnut baffle. These baffles were placed in alternating sequence in the column with about one inch of packing between each baffle. The column was repacked by pouring in Tide which was lightly tamped to an even level and then adding the desired baffle and repeating the sequence. The baffles were then disposed in a vertical spatial arrangement within the packed bed, the holes of the doughnut baffle centered approximately on the longitudinal axis of the glass tube.

FIG. 6 demonstrates that the employment of baffles which inhibit channeling and induce lateral fluid flow promote good separation and resolution in relatively large diameter chromatographic columns. Thus, the baffled column gave excellent separation between all three hydrocarbon components and improved the resolution over the unbaffled relatively large diameter column between the benzene and the TCE. The increase in the retention time in the baffled column is believed to be due to the slight tamping of the packing in the column and to the larger fluid flow path of the sample in the column occasioned by the baffles. Thus, the baffling of a chromatographic column according to my teachings permits chromatographic columns of reduced length to be obtained without reducing the length of the fluid flow path through the column.

It is now possible, in accordance with the teachings of my invention, to extend chromatographic separations to relatively large diameter columns and to employ larger sample sizes. Of course, where necessary to inhibit channeling or to increase the fluid path length relatively small diameter columns may profitably employ the baffles of my invention. Relatively small diameter columns are those analytical chromatographic type columns of up to about 10 millimeters in internal diameter.

My invention is particularly applicable to those chromatographic columns containing packed materials of from one-half inch or greater in internal diameter. Although the illustrative embodiment of my invention has been demonstrated with reference to a vapor phase separation of a hydrocarbon mixture, this is for the purposes of illustration only and demonstrates the superior separations achieved by my baffle arrangement and method.

What I claim is:

1. In an apparatus for the chromatographic separation of fluids, the combination which comprises:
   a chromatographic column containing a plurality of zones of separatory material and means intermediate said zones for improving the resolving power of the column;
   said means including at least first and second transverse partition elements, the total flow area of each of said elements being of reduced cross-sectional area compared to the total cross-sectional area of the column, the first element containing at least one flow passage constructed and arranged to induce non-axial mixing of the fluid moving axially through the column, and the second element downstream of the first element, containing at least one flow passage which is axially non-aligned with the flow passage of the first element and constructed and arranged to divert a substantial part of the fluid, directly after passing through the first element flow passage, into said non-aligned flow passage, whereby the second element induces distribution of the fluid after passing the first element into a zone of separatory material;
   means to introduce a fluid sample stream into the column;
   means to introduce a fluid carrier stream into the column;
   means for withdrawing the sample and carrier fluids from the column; and
   means for detecting the components of the sample fluid.

2. The apparatus of claim 1 wherein the first element is a doughnut-type element.

3. The apparatus of claim 1 wherein the second element includes a plurality of flow passages arranged about the periphery of the element.

4. The apparatus of claim 1 wherein the first element is a doughnut-type element and the second element includes a plurality of flow passages therein.

5. The apparatus of claim 1 wherein at least one element is disposed within a spatial distance in the column equal to the internal diameter of the column.

6. The apparatus of claim 1 wherein the cross-sectional flow area of each element is approximately equal.

7. The apparatus of claim 1 wherein the second element is a disc whose external diameter is less than the internal diameter of the column by a predetermined amount.

8. The apparatus of claim 1 wherein the first and second elements are separated by separatory material.

9. The apparatus of claim 1 wherein the first element directs the flow of the fluid stream toward the center of the column and the second element directs the flow of the fluid stream toward the internal wall of the column.

10. In an apparatus for the chromatographic separation of a gas sample stream, the combination which comprises:
a chromatographic column containing a plurality of zones of separatory material and intermediate said zones means to improve the resolving power of the column, said means including an alternating series of spaced and respectively different transverse baffles means including a first doughnut element to induce substantial lateral flow and mixing of the gas sample stream moving axially through the column, and directly downstream of said first element, a second element containing a plurality of non-axially aligned flow passages therein with the flow passage through the first element, which element diverts at least a part of the gas sample stream from the first element toward the wall of the column and into said non-axially aligned flow passages and the next zone of separatory material;
means to introduce a gas sample stream into the column;
means to introduce a gas carrier stream into the column;
means to detect the separated components of the gas sample stream; and
means to withdraw and recover the gas sample from the column.

11. The improved method of chromatographic separation of a fluid which comprises:
introducing a fluid for separation into a packed chromatographic column;
introducing a carrier fluid into said column to drive said fluid for separation through said column in a generally axial direction;
obstructing axial movement of said fluids by interposing at least a pair of partition elements in said column,
said elements having each a face against which said fluids flow,
said faces being axially spaced,
said faces having transverse components,
said transverse components being different,
and said faces forcing a substantial part of said fluids to move relative to the center of said column in unconfined paths either toward or away from a transverse portion of an inner wall of said column,
one of said faces forcing said fluids to move in one of said paths and
the other of said faces forcing said fluids to move in the other of said paths, movement of said fluid in at least one of said paths causing substantial mixing along the direction of one of said paths thereby improving column resolution, and
withdrawing the separated components of said fluid from the column.

12. The method of claim 11 in which said paths extend radially between said center and said transverse portion.

13. The method of claim 12 in which said paths extend to said center and said transverse portion.

14. The method of claim 13 in which said paths are alternately radially to said center from said inner wall of said column therearound and from said center to said inner wall therearound.

15. The method of claim 14 in which both said transverse components are continuous.

16. The method of claim 11 wherein the fluid sample and carrier streams are gas streams.

17. The method of claim 11 wherein the fluid sample stream comprises a mixture of hydrocarbons.

18. The method of claim 11 which includes detecting the components of the sample stream.

19. The method of claim 11 which includes flowing the fluid streams in a spiral flow path through the column.

20. The method of claim 11 wherein each partition element is separated by separatory material.

21. The method of claim 11 wherein one partition element has one flow passage, and the other partition element includes a plurality of flow passages.

22. A method of promoting the chromatographic separation of a gas sample stream in a chromatographic column containing a plurality of zones of separatory material which method comprises:
introducing a gas sample stream into the column;
introducing a gas carrier stream into the column;
flowing the gas stream through a central flow passage in a first partition element to induce non-axial directional flow and substantial radial mixing of the gas streams moving axially through the column;
directly thereafter diverting at least a part of the mixed gas streams toward the wall of the column by a second partition element having at least some axially non-aligned flow passages with the flow passage of the first element, and introducing the mixed diverted gas streams into a zone of separatory material;
withdrawing the components of the sample stream from the column; and
detecting the components of the sample stream.

23. A method of promoting the chromatographic separation of a fluid sample stream in a chromatographic column containing a plurality of zones of separatory material which method comprises:
introducing a fluid sample stream into the column;
introducing a fluid carrier stream into the column;
flowing the fluid streams past a first partition element which has at least one flow passage to induce non-axial directional flow of the fluid streams moving axially through the column thereby affecting radial mixing of the streams; and
thereafter diverting a substantial part of the mixed fluid streams by a second partition element, to a flow passage in said second partition element axially non-aligned with the flow passage in said first partition element, directly after flow of said streams through said flow passage in said first partition element, and introducing the mixed diverted streams into a zone of separatory material;
withdrawing the components of the sample stream from the column; and
detecting the components of the sample stream.

24. The method of claim 23 wherein the fluid sample and carrier streams are gas streams.

25. The method of claim 23 wherein the fluid sample stream comprises a mixture of hydrocarbons.

26. The method of claim 23 wherein the flowing of the streams past the partition elements is in a lateral alternating direction toward and away from the axis of the column.

27. The method of claim 23 wherein the components are detected by their thermal conductivity in reference to the thermal conductivity of the carrier fluid.

28. The method of claim 23 which includes flowing the fluid streams in a spiral flow pattern through the column.

29. The method of claim 23 wherein each partition element is separated by separatory material.

30. The method of claim 23 wherein the partition element to induce non-axial directional flow has a central flow passage, and the partition element to divert the streams includes a plurality of flow passages adjacent the wall of the column.

References Cited by the Examiner

UNITED STATES PATENTS 2,845,136  7/1958  Robinson _____ 55—67
3,047,992  8/1962  Jones _____ 55—67

FOREIGN PATENTS 1,258,723  6/1961  France.

OTHER REFERENCES

Hagdahl, L.: Some Technical Improvements in Adsorption Analysis, In Acta Chemical Scandinavica 2 (1948) pp. 574–582.

REUBEN FRIEDMAN, *Primary Examiner*.